United States Patent [19]
Reid

[11] Patent Number: 4,552,508
[45] Date of Patent: Nov. 12, 1985

[54] WEAR RING MOUNT FOR LIFT PUMPS
[75] Inventor: Robert A. Reid, Charlton City, Mass.
[73] Assignee: CPC Engineering Corporation, Sturbridge, Mass.
[21] Appl. No.: 504,463
[22] Filed: Jun. 15, 1983
[51] Int. Cl.[4] .................. F16C 13/04; F03B 11/06
[52] U.S. Cl. ...................... 415/72; 384/549; 74/448
[58] Field of Search .................. 415/71–73, 415/134–136, 219 C; 403/28–30, 408; 248/DIG. 1; 308/203; 384/549; 34/135; 74/447, 448

[56] References Cited

U.S. PATENT DOCUMENTS

| 1,188,566 | 6/1916 | Singer | 384/549 X |
| 2,249,831 | 7/1941 | How | 34/135 UX |
| 3,247,601 | 4/1966 | Sims | 384/549 |
| 3,944,297 | 3/1976 | Stedman | 74/448 |
| 4,019,830 | 4/1977 | Reid | 415/72 |
| 4,160,569 | 7/1979 | Reid | 308/203 |
| 4,222,704 | 9/1980 | Reid | 415/72 |
| 4,447,966 | 5/1984 | Mollenkopf et al. | 34/108 |

Primary Examiner—Robert E. Garrett
Assistant Examiner—Joseph M. Pitko
Attorney, Agent, or Firm—Eugene E. Geoffrey, Jr.

[57] ABSTRACT

In an elongated, inclined tubular lift pump for fluids such as sewage and the like having apparatus at the upper end for rotation thereof and a support adjoining the lower end thereof, said support including a wear ring encircling the tubular housing and roller enaging said wear ring, said wear ring being secured to said tubular housing by a plurality of blocks positioned on opposing sides of said wear ring and secured to the tubular housing, each of said blocks having an inclined slot and pins carried by the sides of said wear ring and engaging said slots to permit rotation of said wear ring relative to said tubular housing with changes in temperature differentials between the wear ring and tubular housing while maintaining concentricity of the wear ring and housing and thus relieving stress on said tubular housing.

9 Claims, 10 Drawing Figures

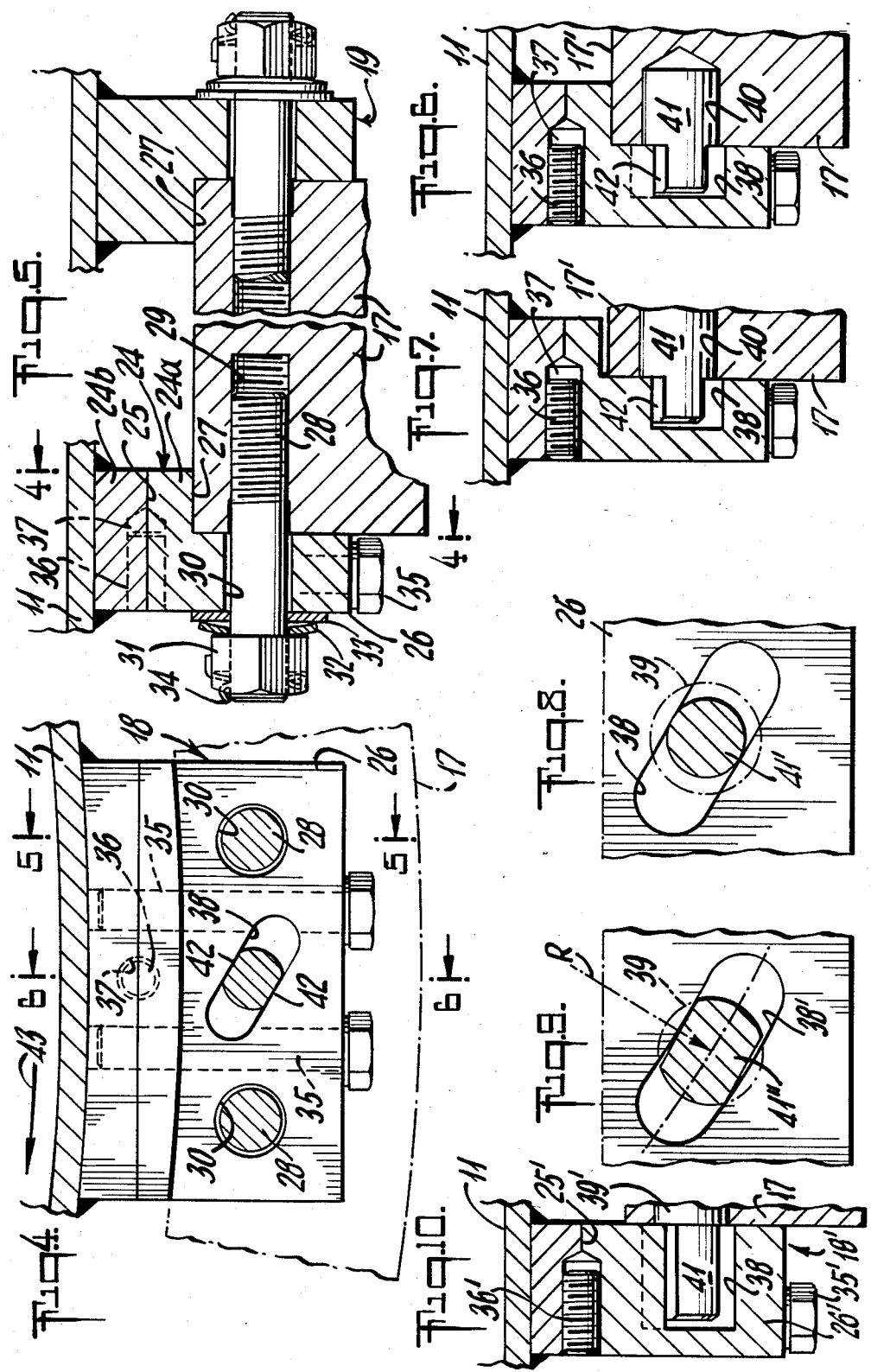

WEAR RING MOUNT FOR LIFT PUMPS

This invention relates to lift pumps having an elongated, inclined, rotatable tubular housing, flights within said tubular housing and rotatable therewith and a wear ring surrounding said tubular housing at a point spaced from the bottom end thereof for engaging roller supports, and more specifically to novel and improved means for attaching said wear ring to said tubular housing to compensate for differences in expansion and contraction of the wear ring and tubular housing resulting from temperature differentials.

The elongated tubular housing of lift pumps is generally formed with wall thickness of the order of one-quarter to three-quarters of an inch while the wear ring may be of the order of three inches or more in thickness and a width of the order of twelve inches or more. Blocks are secured to the outer wall of the tubular housing and bolted to the wear ring which may have an ID of two inches or more greater than the OD of the tubular member. Since lift pumps are usually in unprotected areas which are subject to solar radiation, both the wear ring and tubular housing may attain relatively high temperatures when the pump is not operated. Should the pump then be operated to initiate the pumping operation, the liquid on being pumped will cool the tubular member rapidly, but because of the large mass of the wear ring, it will cool very slowly with the result that large stresses will develop at the points where the wear ring supporting blocks are attached to the tubular housing and may create sufficient stress to seriously distort if not damage the tubular housing.

This invention provides a novel and improved means for securing the wear ring to the tubular housing which will automatically compensate for changes in temperature and at the same time maintain the wear ring in substantially concentric relationship with the tubular housing at all times.

Another object of the invention resides in the provision of novel and improved means for removably securing a wear ring to the housing of a tubular lift pump that will firmly attach the ring to the pump and at the same time compensate for temperature differentials occurring during both intermittent and continuous operation to prevent stresses at the points of attachment to the tubular housing while maintaining concentricity of the ring with the tubular housing.

The invention in the preferred form comprises a first plurality of L-shaped blocks secured to the tubular housing of the pump for engagement with the upper side of the wear ring. Each block includes an elongated sloping slot for slidable engagement with a pin carried by the wear ring and means for slidably securing the ring to the blocks. A second set of L-shaped blocks is provided on the lower side of the ring with the lower leg of each block being in the form of a split leg with the bottom portion of the split leg being secured to the tubular pump housing and means for attaching the upper portion of each block to the bottom portion of the split leg. The outwardly extending leg of the L-shaped block has an inclined slot engaging a pin carried by the wear ring and means for slidably securing said outwardly extending block portion to the wear ring and fixedly securing it to the lower block portion. The slots in both sets of blocks have the same degree and direction of inclination.

The above and other objects and advantages will become more apparent from the following description and accompanying drawings forming part of this application.

IN THE DRAWINGS

FIG. 4 is a cross-sectional view of FIG. 5 taken along the line 4—4 thereof;

FIG. 5 is a cross-sectional view of FIG. 4 taken along the line 5—5 thereof;

FIG. 6 is a cross-sectional view of FIG. 4 taken along the line 6—6 thereof;

FIG. 7 is a fragmentary section similar to FIG. 6 showing a modification thereof;

FIG. 8 is a fragmentary section of FIG. 4 and showing another modification thereof;

FIG. 9 is a view similar to FIG. 8 showing still a further modification of the invention; and FIG. 10 is a view similar to FIG. 6 showing a modification of the wear ring mount.

Figure 1:
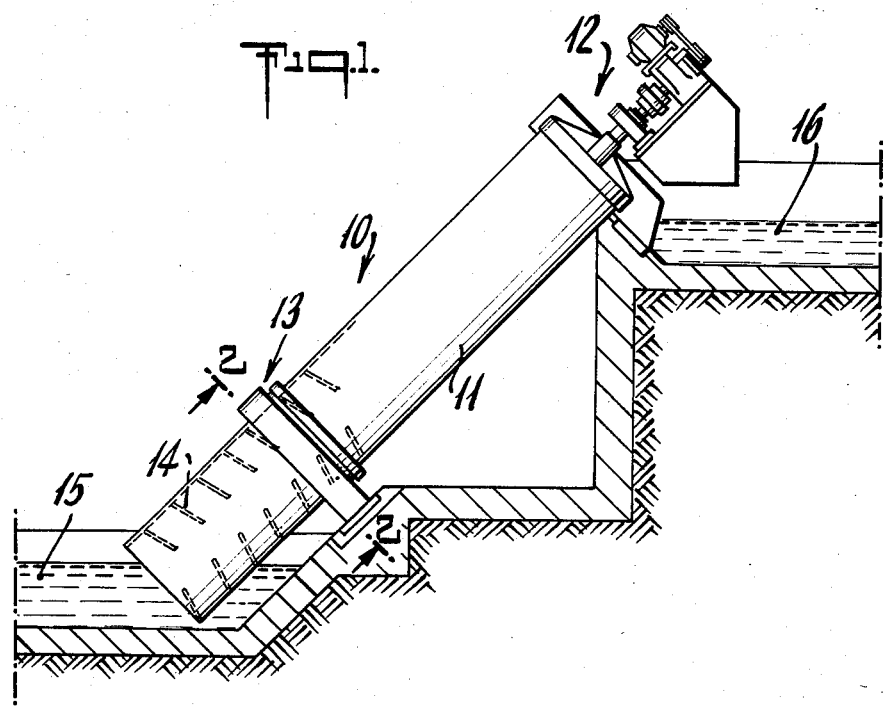
FIG. 1 is a side elevational view in partial section of one embodiment of a lift pump embodying the invention.

A lift pump in accordance with the invention and denoted generally by the numeral 10 is illustrated in FIG. 1 and includes an elongated cylindrical tubular housing 11, an upper support and driving means generally denoted by the numeral 12 and a lower support 13 embodying the inventive subject matter. The lift pump has an elongated screw or helical flights 14 to lift fluid from a lower sump 15 to an upper sump or reservoir 16 as the tubular housing 11 is rotated. A pump of the type illustrated in FIG. 1 forms the subject matter of prior U.S. Pat. No. 4,019,830 granted Apr. 26, 1977.

Figure 2:
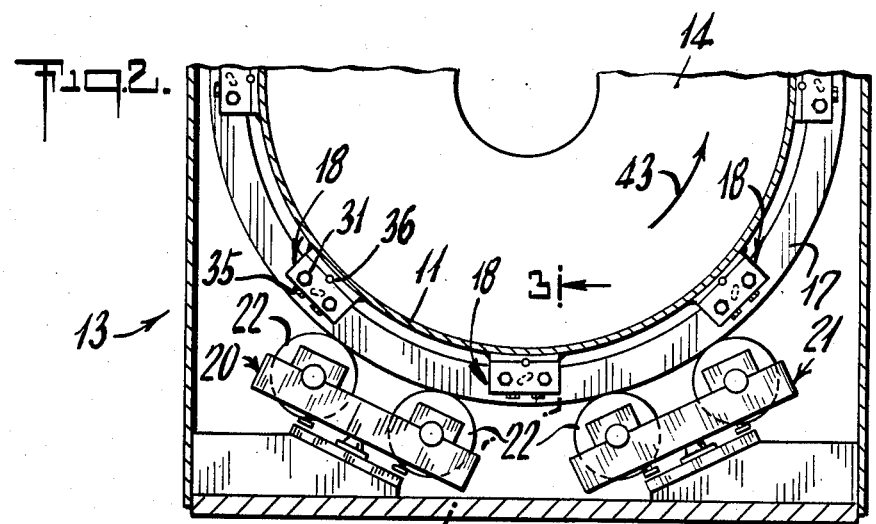
FIG. 2 is a cross-sectional view of a fragmentary portion of FIG. 1 taken along the line 2—2 thereof.
Figure 3:
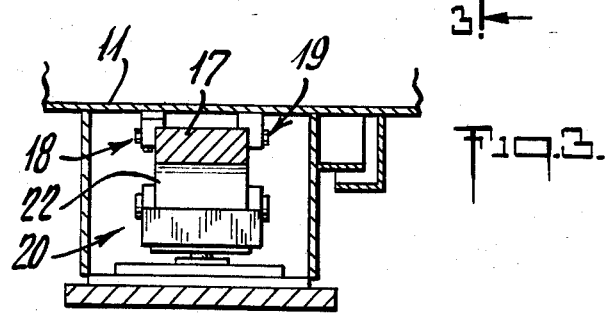
FIG. 3 is a cross-sectional view of FIG. 2 taken along the line 3—3 thereof.

The lower housing support 13 is shown more clearly in FIGS. 2 and 3. In order to avoid damage to the tubular housing 11 during rotation thereof, a wear ring 17 surrounds the tubular housing 11 and is secured thereto by a plurality of mounting brackets or blocks 18 on the lower side of the wear ring which blocks are welded to the tubular housing 11 and are secured to the wear ring. Similar blocks 19 are positioned about the upper side of the wear ring and also welded to the tubular housing 11. A pair of carriages generally denoted by the numerals 20 and 21 each include a pair of rollers 22 which rotatably engage the wear ring 17. These carriages are discussed in detail in U.S. Pat. No. 4,160,569 granted July 10, 1979.

Lift pumps for handling large volumes of liquid and specifically sewage can be of the order of two to ten feet in diameter or even greater and may have lengths of the order of thirty feet or more. Because of the size of these pumps, they are customarily placed in unprotected positions outdoors with the result that they are subjected to wide changes in temperature. For instance, if the pump is not running and is in the open sun, the pump housing and wear ring will attain essentially the same relatively high temperature. However, when the pumping operation is initiated, the liquid being pumped will usually be at a very much lower temperature with the result that the tubular housing 11 which has a lower mass than the wear ring will cool rapidly while the wear ring 17 will normally stay at the relatively high temperature until the heat in the ring is slowly dissipated through the plurality of supporting blocks 18 and 19. Normally, exposure of the pump housing 11 and the ring 17 poses little if any real problem when the pump is not running. The major problem occurs, as mentioned above, when both the housing 11 and ring 17 are at a high temperature and the housing 11 is suddenly cooled as the result of pumping action, as this places severe stress on the attachment blocks 18 and 19 and the housing 11. With this invention, means are provided for compensating for a high temperature differential beween the pump housing 11 and the ring 17 and thus avoids the creation of excessive stresses on the blocks 18 and 19 and the housing 11 and this compensating means is shown more clearly in FIGS. 4 through 10. It is to be understood that the blocks 18 and 19 are substantially identical with the exception that the block 18 is formed in two sections in order to facilitate installation and removal of the wear ring 17. Therefore, for convenience, the blocks 18 are shown in detail and it is to be understood that the blocks 19 would be formed in a similar manner except that the blocks 19 are formed in one piece.

Referring now to FIGS. 4 and 5 which illustrate in detail the block 18 and its attachment to the wear ring 17 and tubular housing 11, it consists of a base portion generally denoted by the numeral 24 which is split along the line 25 to provide independent sections 24a and 24b and an outwardly extending portion or leg 26 so that each of the blocks is in the form of an L. The block 19 is identical to the block 18 except that the block 19 is not split along the line 25. The structure of block 18 is required in order to permit installation and removal of the wear ring 17. It will also be observed that the blocks 18 are on the lower side of the wear ring whereas the blocks 19 are on the upper side of the wear ring. The blocks 18 and 19 are welded to the tubular housing 11 as indicated in these figures. The shoulder 27 formed in the block portion 24a has a radius corresponding to the internal radius of the wear ring 17 and the wear ring 17 is secured to the block 18 by a pair of studs 28 threadably engaging openings 29 formed in the wear ring 17 and cooperating nuts 31. The studs 28 extend outwardly through cooperating openings 30 in the block portion 26 which openings are slightly larger in diameter than the diameter of the studs 28. The wear ring is held in engagement with the block 26 by means of a nut 31, a spring washer 32 and a flat washer 33 and the nut is held in position by a cotter-pin 34. Since the block 19 is secured to the wear ring 17 in like manner, it follows that the wear ring 17 can shift angularly relative to the tubular housing 11 of the lift pump. The portion of the block formed by legs 24a and 26 are secured to the block portion 24b by a pair of bolts 35 extending through openings in the portions 26 and 24a and threadably engaging the block portion 24b. To relieve the load on the bolts 35, a set screw 36 threadably engages on opening 37 drilled on the center line 25.

In order to maintain the wear ring 17 substantially concentric with the tubular member or housing 11, each block 18 and 19 includes an elongated inclined slot 38 as shown more clearly in FIGS. 4 and 6. Cylindrical pins 39 engage cooperating openings 40 in the wear ring 17 and the portion of each pin 41 projecting from the edge of the wear ring 17 is formed with opposing flats 42 for slidably engaging a slot 38. With the foregoing arrangement and when the temperature of the tubular housing 11 and the wear ring 17 are substantially the same, the wear ring will be seated on the shoulders 27 of the blocks 18 and 19. This will occur notwithstanding the actual temperature of both the tubular housing or the wear ring 17 provided however they are the same. Should operation suddenly be initiated, the liquid such as sewage and the like which is customarily at a fairly low temperature will suddenly cool the tubular housing 11 and if the wear ring 17 is fixedly secured to the housing 11, substantial stress will be developed on the housing 11 because of the high temperature of the wear ring 17 and the relatively low temperature of the housing 11. However, with the arrangement as shown in FIGS. 4 through 6 and with rotation of the housing 11 in the direction of the arrow 43, the wear ring by reason of its engagement with the rollers 22 on the carriages 20 and 21 will have a tendency to lag behind the tubular housing 11 and produce displacement of the wear ring since the holes 30 in the blocks 18 and 19 are somewhat larger than the diameter of the studs 28. Accordingly, the end portions 41 of the pins 39 will ride downwardly within the slot 38 and thus compensate for the temperature differential between the wear ring 17 and the housing 11. Moreover, since a plurality of blocks are disposed about the housing 11 for the support of the wear ring 17 and since both sets of blocks 18 and 19 are formed in a similar manner and secured to the wear ring 17 in a similar manner, the wear ring 17 will automatically maintain concentricity with the tubular housing 11. In this way, a temperature differential between the housing 11 and the wear ring 17 will not stress and cause deformation of the tubular housing 11. In the event pump operation should be terminated before the wear ring 17 achieves the temperature of the tubular housing 11, as the temperature of the tubular housing 11 increases as a result of exposure to the sun's rays, a relative shift will occur between the wear ring 17 and the tubular housing 11 to automatically relieve any stresses on the housing 11.

In the event a situation should be encountered wherein the wear ring 17 may achieve a lower temperature than the tubular housing 11, a structure such as shown in FIG. 7 may be employed. In this case, it will be observed that the shoulders 27 of the blocks 18 and 19 are spaced from the inner surface 17' of the wear ring 17 when the wear ring 17 and tubular housing 11 are at the same temperature. With this arrangement, little if any stress will be placed on the tubular housing 11 notwithstanding the nature of the temperature differential between the wear ring 17 and the housing 11.

A further modification of the invention is illustrated in FIG. 8. In this figure, it will be observed that the end portion 41' of the pin 39 has a cylindrical configuration and can slide within the slot 38' in the same manner as the pin 39 shown in FIGS. 4 through 6.

A still further modification of the invention is shown in FIG. 9 wherein the slot denoted herein by the numeral 38' has a radius R and the end portion 41" of each pin has opposing flats which may have an appropriate radii to correspond to the curvature of the slot 38'.

A still further modification of the invention is shown in FIG. 10. In this form of the invention, the block denoted by the numeral 18' is similar to the block 18 except that it has a rectangular configuration instead of the L-shaped configuration shown for instance in FIGS. 5 and 6. The block 18' is split along the line 25' and as in the case of the block 18 includes bolts 35' and the set screw 37'. The block portion 26' includes an inclined slot 38 or 38' as the case may be, a pin 39' and an extending portion 41 having flats on opposing sides thereof for engagement with the slot as described in connection with FIGS. 4 through 6. In this form of the invention, it will be observed that a shoulder 27 is not provided and therefore this form of the invention will function in a manner similar to that illustrated and described in connection with FIG. 7. It is understood of course that the slot 38 and pin portion 41 may be formed as illustrated in FIGS. 8 and 9 and blocks 19' (not shown) would have a similar construction. The blocks 18' and 19' would be secured to the tubular housing 11 and the wear ring 17 in the same manner described in connection with the previous figures.

While only certain embodiments of the invention have been illustrated and described, it is understood that alterations, changes and modifications may be made without departing from the true scope and spirit thereof.

What is claimed is:

1. Mounting means for securing a wear ring to the tubular housing of an elongated inclined lift pump for rotatably supporting the lower end of said housing on cooperating rollers comprising a first plurality of blocks spaced uniformly about said tubular housing and secured thereto, each of said blocks including a slot having axes disposed in a plane perpendicular to the axis of said ring and inclined relative to the housing with the leading end spaced outwardly from the housing a distance greater than the trailing end, a plurality of pins carried by and extending from the upper side of said wear ring and engaging said slots, a second plurality of blocks spaced uniformly about and secured to said tubular housing adjoining the lower side of said wear ring when the latter is in engagement with the first set of blocks, each of the last said blocks having a slot parallel to the first said slots and inclined in the direction thereof and pins carried by the lower side of said wear ring and engaging the last said slots, said slots being of arcuate shape having the concave side facing said tubular housing.

2. Mounting means according to claim 1 wherein said pins are each rotatably carried by said wear ring with a portion extending therefrom, said extending portion having opposing curved surfaces with the distance therebetween and the curvatures thereof corresponding to the width of the associated slot and the curvature thereof.

3. Mounting means for securing a wear ring to the tubular housing of an elongated inclined lift pump for rotatably supporting the lower end of said housing on cooperating rollers comprising a first plurality of blocks spaced uniformly about said tubular housing and secured thereto, each of said blocks including a slot having axes disposed in a plane perpendicular to the axis of said ring and inclined relative to the housing with the leading end spaced outwardly from the housing a distance greater than the trailing end, a plurality of pins carried by and extending from the upper side of said wear ring and engaging said slots, a second plurality of blocks spaced uniformly about and secured to said tubular housing adjoining the lower side of said wear ring when the latter is in engagement with the first set of blocks, each of the last said blocks having a slot parallel to the first said slots and inclined in the direction thereof and pins carried by the lower side of said wear ring and engaging the last said slots, at least one opening extending through each block in a direction parallel to the axis of said ring, a bolt extending through the last said opening and threadably engaging said wear ring and spring means disposed between the head of said bolt and said block to hold the block in slidable engagement with the wear ring, the last said opening having a diameter greater than the diameter of said bolt to permit displacement of said ring relative to said tubular housing.

4. Mounting means for securing a wear ring to the tubular housing of an elongated inclined lift pump for rotatably supporting the lower end of said housing on cooperating rollers comprising a first plurality of blocks spaced uniformly about said tubular housing and secured thereto, each of said blocks including a slot having axes disposed in a plane perpendicular to the axis of said ring and inclined relative to the housing with the leading end spaced outwardly from the housing a distance greater than the trailing end, a plurality of pins carried by and extending from the upper side of said wear ring and engaging said slots, a second plurality of blocks spaced uniformly about and secured to said tubular housing adjoining the lower side of said wear ring when the latter is in engagement with the first set of blocks, each of the last said blocks having a slot parallel to the first said slots and inclined in the direction thereof and pins carried by the lower side of said wear ring and engaging the last said slots, said wear ring having an inside diameter greater than the outside diameter of said tubular housing, each of said blocks are of L-shaped configuration with one leg lying parallel to the surface of said housing and extending beneath said ring, the thickness of said one leg being equal to one-half the difference between the outside diameter of said housing and the inside diameter of said ring when said ring and housing are at substantially the same temperature.

5. Mounting means for securing a wear ring to the tubular housing of an elongated inclined lift pump for rotatably supporting the lower end of said housing on cooperating rollers comprising a first plurality of blocks spaced uniformly about said tubular housing and secured thereto, each of said blocks including a slot having axes disposed in a plane perpendicular to the axis of said ring and inclined relative to the housing with the leading end spaced outwardly from the housing a distance greater than the trailing end, a plurality of pins carried by and extending from the upper side of said wear ring and engaging said slots, a second plurality of blocks spaced uniformly about and secured to said tubular housing adjoining the lower side of said wear ring when the latter is in engagement with the first set of blocks, each of the last said blocks having a slot parallel to the first said slots and inclined in the direction thereof and pins carried by the lower side of said wear ring and engaging the last said slots, said wear ring having an internal diameter greater than the outside diameter of said tubular housing, each of said second plurality of blocks is formed in two parts with the plane of separation being substantially parallel to the surface of the tubular housing and positioned between said tubular housing and the inner surface of said ring and means including at least two bolts securing said parts one to the other.

6. Mounting means according to claim 5 wherein the last said means further includes a threaded opening transversely of said block and in the plane of separation and a threaded element engaging the last said opening.

7. Mounting means for securing a wear ring to the tubular housing of an elongated inclined lift pump for rotatably supporting the lower end of said housing on cooperating rollers comprising a first plurality of blocks spaced uniformly about said tubular housing and secured therto, each of said blocks including a slot having axes disposed in a plane perpendicular to the axis of said ring and inclined relative to the housing with the leading end spaced outwardly from the housing a distance greater than the trailing end, a plurality of pins carried by and extending from the upper side of said wear ring and engaging said slots, a second plurality of blocks spaced uniformly about and secured to said tubular housing adjoining the lower side of said wear ring when the latter is in engagement with the first set of blocks, each of the last said blocks having a slot parallel to the first sid slots and inclined in the direction thereof and pins carried by the lower side of said wear ring and engaging the last said slots, said pins each being rotatably carried by said wear ring with a portion thereof extending therefrom, said extending portion slidably engaging the associated slot.

8. Mounting means according to claim 7 wherein said extending portion is cylindrical with the diameter corresponding to the width of said associated slot.

9. Mounting means according to claim 7 wherein said extending portion includes opposing flats with the distance between the flats corresponding to the width of the associated slot.

* * * * *